(12) United States Patent
Roe

(10) Patent No.: US 11,708,535 B2
(45) Date of Patent: Jul. 25, 2023

(54) HYDROCARBON LIQUID BASED CHEMICAL COMPOSITIONS AND TREATMENT METHODS USING SAME FOR REMEDIATING H2S AND OTHER CONTAMINANTS IN FLUIDS AND MIXTURES OF CONTAMINATED FLUIDS

(71) Applicant: GAPS TECHNOLOGY, LLC, Slidell, LA (US)

(72) Inventor: Cliffton Lee Roe, Harrison Township, MI (US)

(73) Assignee: Gaps Technology, LLC., Slidell, LA (US)

(*) Notice: Subject to any disclaimer, the term of this patent is extended or adjusted under 35 U.S.C. 154(b) by 0 days.

(21) Appl. No.: 17/857,582

(22) Filed: Jul. 5, 2022

(65) Prior Publication Data
US 2022/0356407 A1 Nov. 10, 2022

Related U.S. Application Data

(63) Continuation of application No. PCT/US2022/028155, filed on May 6, 2022.
(Continued)

(51) Int. Cl.
*C10G 29/20* (2006.01)
*C10G 29/16* (2006.01)
(Continued)

(52) U.S. Cl.
CPC .............. *C10G 29/20* (2013.01); *C10G 29/10* (2013.01); *C10G 29/16* (2013.01); *C10L 3/103* (2013.01);
(Continued)

(58) Field of Classification Search
CPC ........ C10G 29/10; C10G 29/16; C10G 29/20; C10G 2300/207; C10L 3/103; C10L 2290/544; C10L 3/104
See application file for complete search history.

(56) References Cited

U.S. PATENT DOCUMENTS 2,592,523 A  4/1952  Ayers et al.
3,262,753 A  7/1966  Urano et al.
(Continued)

FOREIGN PATENT DOCUMENTS

EP   0 432 858 A1   6/1991
WO   2019/036731 A2  2/2019
WO   2019/209379 A1  10/2019

OTHER PUBLICATIONS

Smaillwood, I., 1996, Handbook of Organic Solvent Properties, Butterworth-Heinemann, 306pp. (Year: 1996).*
(Continued)

*Primary Examiner* — Brian A McCaig
(74) *Attorney, Agent, or Firm* — Carrier, Shende & Associates P.C.; Joseph P. Carrier; Fulchand P. Shende (57) ABSTRACT

A treatment composition for remediating for remediating $H_2S$, $CO_2$ and other contaminant(s) in a fluid mixture of contaminated liquids and gasses comprising: a hydrocarbon based liquid; and at least one hydroxide compound dispersed or dissolved into the hydrocarbon based liquid. The at least one hydroxide compound dispersed or dissolved into the hydrocarbon based liquid constitutes 30-50 wt % of the treatment composition, the at least one hydroxide compound includes at least one of potassium hydroxide and sodium hydroxide, and a pH of the treatment composition is in a range of 13-14.0.

17 Claims, 1 Drawing Sheet

Related U.S. Application Data (60) Provisional application No. 63/293,471, filed on Dec. 23, 2021, provisional application No. 63/185,808, filed on May 7, 2021.

(51) Int. Cl.
*C10G 29/10* (2006.01)
*C10L 3/10* (2006.01)

(52) U.S. Cl.
CPC ........ *C10L 3/104* (2013.01); *C10G 2300/207* (2013.01); *C10L 2290/544* (2013.01)

(56) References Cited

U.S. PATENT DOCUMENTS

| | | | |
|---|---|---|---|
| 3,586,622 | A | 6/1971 | Thompson |
| 3,708,421 | A | 1/1973 | Rippie |
| 3,897,219 | A | 7/1975 | Sibeud et al. |
| 4,417,986 | A | 11/1983 | Connaught et al. |
| 4,746,442 | A | 5/1988 | Calemma et al. |
| 5,601,700 | A | 2/1997 | Bridge et al. |
| 5,635,056 | A | 6/1997 | Brons et al. |
| 6,447,577 | B1 | 9/2002 | Espin et al. |
| 7,438,877 | B2 | 10/2008 | Salma et al. |
| 7,914,669 | B2 | 3/2011 | Martinie et al. |
| 7,922,907 | B2 | 4/2011 | Hassan et al. |
| 8,759,252 | B1 | 6/2014 | Callaway |
| 9,028,679 | B2 | 5/2015 | Morris |
| 9,364,773 | B2 | 6/2016 | Morris |
| 10,550,337 | B2 | 2/2020 | Roe et al. |
| 2009/0065399 | A1 | 3/2009 | Kocal et al. |
| 2009/0320683 | A1* | 12/2009 | Hintz .............. B01D 53/62 96/275 |
| 2010/0056404 | A1 | 3/2010 | Talley |
| 2015/0037274 | A1 | 2/2015 | Walia et al. |
| 2019/0153332 | A1 | 5/2019 | Roe et al. |

OTHER PUBLICATIONS

Marcus, Y., 2016, "Solubility Parameters of Permanent Gases," Journal of Chemistry, Article ID 4701919, 18 pp. <https://doi.org/10.1155/2016/4701919> (Year: 2016).*

PCT/ISA/210 from International Application PCT/US2022/28155, of which this application is a national phase of.

Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.

Miike Nicholson/Tim O'brian, Baker Petrolite Corporation, "Hydrogen Sulfide in Petroleum", pp. 1-28, found at www.coqa-inc.org/docs/default-source/meeting-presentations/20010531H25.pdf.

Heitman et al., "Oxidation and incorporation of hydrogen sulfide by dissolved organic matter", Chemical Geology 235 (2006), pp. 12-20.

Yang et al., "Novel Process of Removal of Sulfur Dioxide by Aqueous Ammonia-Fulvic Acid Solution with Ammonia Escape Inhibition", energy&fuels article 2016, 30, pp. 3205-3218.

Pohlabein et al., "Experimental Evidence for Abiotic Sulfurization of Marine Dissolved Organic Matter", frontiers in Marine Science,, published Nov. 15, 2017, vol. 4, Article 364, pp. 1-11.

Shi X, Li Q,Wang T, Lackner KS (2017), "Kinetic analysis of an anion exchange absorbent for CO2 capture fromambient air." PLoS ONE 12(6): e0179828. https://doi.org/10.1371/journal. pone. 0179828, pp. 1-12.

Elliot, Louis D., "The freezing point curve of the system water-ammonia", The Journal of Physical Chemistry 28.8 (Aug. 1924): pp. 887-888, Figure 1.

Bauer et al., "Electron Transfer Capacities and Reaction Kinetics of Peat Dissolved Organic Matter", Environmental Science & Technology, vol. 41, No. 1, 2007, pp. 139-145.

Boggs et al., "Humic Substances In Natural Waters and Their Complexation With Trace Metals And Radionuclides: A Review", Argonne National Laboratory, Illinois, 60439, Chemical Technology Division, Jul. 1985.

Einsiedl et al., "Evidence for Incorporation of H2S in Groundwater Fulvic Acids from Stable Isotope Ratios and Sulfur K-edge X-ray Absorption Near Edge Structure Spectroscopy", Environmental Science & Technology, vol. 42, No. 7, 2008, pp. 2439-2444.

Einseidl et al., "Combined sulfur K-edge XANES spectroscopy and stable isotope analyses of fulvic acids and groundwater sulfate identify sulfur cycling in a karstic catchment area", Chemical Geology, 238, 2007, pp. 268-276.

Perlinger et al., "Addition of Hydrogen Sulfide to Juglone", Environmental Science & Technology, vol. 36, No. 12, 2002, pp. 2663-2669.

Senesi et al., "The Role of Free Radicals in the Oxidation and Reduction of Fulvic Acid", Soil Research Institute, Agriculture Canada, Soil Biol. Biochem. vol. 9, 1977, pp. 397-403.

Zhiguo Yu, "Electron Transfer Processes between Hydrogen Sulfide and Humic Substances—Implications for Anaerobic Sulfur Cycling in Freshwater Ecosystems", Dissertation to obtain the degree of Doctor of Natural Sciences at the Faculty of Biology / Chemistry / Earth Sciences.

Baguena, Beltran, "Humic acids and Fulvic acids I Humic Acids: Interview with D. Gregorio Murillo by the communications department of ACEA" Jilco Industrial, SA, (2019) (obtqained from acidoshumicos.com Nov. 2019) (Year: 2019).

* cited by examiner

HYDROCARBON LIQUID BASED CHEMICAL COMPOSITIONS AND TREATMENT METHODS USING SAME FOR REMEDIATING H2S AND OTHER CONTAMINANTS IN FLUIDS AND MIXTURES OF CONTAMINATED FLUIDS

CROSS-REFERENCE TO RELATED APPLICATIONS

This is continuation of International Application of PCT/US2022/28155, filed May 6, 2022, which claims priority to U.S. Provisional Application Ser. No. 63/185,808, filed May 7, 2021 and U.S. Provisional Application Ser. No. 63/293,471, filed Dec. 23, 2021. The entire subject matter of these priority applications are incorporated by reference herein.

BACKGROUND OF THE INVENTION

1. Field of the Invention

The present disclosure relates to novel hydrocarbon liquid based treatment compositions and treatment systems and methods using the treatment compositions for remediating including $H_2S$, $CO_2$ and other contaminants in various contaminated fluids, including crude oil and other petroleum based liquids, aqueous solutions including so-called "produced water" that is extracted from the earth with crude oil, gasses including natural gas, as well as mixtures of such fluids. More particularly, the present disclosure relates to such treatment compositions, systems and methods in which contaminated fluids and mixtures of contaminated fluids are chemically reacted with the novel hydrocarbon liquid based treatment compositions whereby the contaminants in the mixed fluids are rapidly remediated down to significantly reduced levels in a practical, efficient and economical manner, and in some instances while also preventing generation and release of precipitates from the treated fluids during the treatment process.

2. Background

Sulfur-containing compounds including hydrogen sulfide ($H_2S$) have long been recognized as undesirable contaminants in hydrocarbon fluids including crude oil, natural gas and liquefied petroleum gas (LPG), as well as in aqueous solutions such as produced water extracted from the earth along with crude oil and in natural gas and in refined petroleum liquids. $H_2S$ is a particularly undesirable contaminant because it is highly toxic to humans and other animals, corrosive to metals, etc. Generally, hydrocarbon fluids should contain less than five ppm $H_2S$ for commercial purposes. Remediation of $H_2S$ in hydrocarbon fluids has long been and remains a very important focus of petroleum based industries around the world. Remediation of contaminated gasses, including natural gas, is far more challenging than remediation of contaminated liquids, and based on currently known technology in many cases cannot be achieved as a practical, cost efficient matter.

Further, many of the hydrocarbon based fluids which are extracted from the ground may contain significant amounts of many other contaminants, including other sulfur-based contaminants besides $H_2S$, carbon dioxide ($CO_2$), sodium chloride (NaCl), nitrogen ($N_2$), water, etc., which are not necessarily removed during a refining process but should also be remediated down to low, acceptable levels to improve the quality and value of the treated hydrocarbon fluids and to reduce undesirable emissions when some of these fluids are burned, e.g., when fuels from crude oil and natural gas are combusted they typically generate $SO_2$ which is a gas that is irritable to humans.

The presence of these other contaminants in the fluids being treated will typically complicate the treatment required for remediating $H_2S$, and has conventionally required additional, special treatment compositions and methods beyond those used for remediating $H_2S$ in the contaminated fluids. A particular complicating factor in treating naturally occurring hydrocarbon based fluids such as crude oil and natural gas, is the fact that such fluids typically have widely varying characteristics that must be considered and addressed. For example, even in relation to one given well which outputs a mixture of crude oil, natural gas and produced water, the fluids extracted from the well may have characteristics which can vary greatly, e.g., crude oil or natural gas extracted from a given well at a given time on a given day, can contain amounts of $H_2S$, as well as various types and amounts of other contaminants, which are significantly different from the amounts of such contaminants contained in crude oil or natural gas extracted from the same well on the same day, but at a different time. Also, the produced water and the natural gas containing water vapor will often have significant amounts of contaminating salts, including NaCl, dissolved therein, and while the salts may not be toxic or particularly harmful to humans like $H_2S$, presence of such salts creates special concerns for most remediation processes because the salts tend to precipitate out of the treated fluids during the treatment processes and may likely cause problems of blockage and the like which must be addressed.

Additionally, there are situations where other chemicals may have been added to the contaminated liquids for other purposes besides remediation of $H_2S$, $CO_2$ and other contaminants, and these other chemicals may cause undesired reactions with the treatment compositions added for remediation of $H_2S$, $CO_2$ and other contaminants. For example, with oil wells there is often concern about corrosion of piping associated with the well, so that corrosion inhibiting chemicals such as silicate-based corrosion inhibitors may be added to the contaminated fluids being extracted from the well. Such silicate-based corrosion inhibitors may react with the treatment compositions added for remediation of $H_2S$, $CO_2$ and other contaminants, especially aqueous based treatment compositions, as well as with contaminant(s) in the fluids to cause various problems such as precipitation of various matter from the treated fluids, leading to problems of blockage, reduced flow, etc. As a particular example, silicate-based corrosion inhibitors may react with aqueous based treatment compositions such as previously proposed by the present inventor in International Patent Application Nos. PCT/US2018/050913 and PCT/US2018/064015, and in U.S. Pat. No. 10,913,911 B2 especially when there is also a significant amount of $CO_2$ in the fluids being extracted, which is regularly experienced, as the $CO_2$ may be converted into carbonate crystals that precipitate out of the treated fluids. This tends to occur especially when the pH of the treated fluids is above 10.

The inventor's previously proposed treatment compositions and treatment processes disclosed in International Patent Application Nos. PCT/US2018/050913 and PCT/US2018/064015, and in U.S. Pat. No. 10,913,911 B2 may be used for remediating $H_2S$ and other contaminants in various contaminated fluids. The entire contents of these prior disclosures are incorporated herein by reference. These previously disclosed treatment compositions are aqueous based compositions primarily involving high concentrations, such as 35-55 wt % collectively, of one or more hydroxide compounds dissolved in water and correspondingly have a pH of about 14. When the previously proposed treatment compositions are added to or otherwise contacted with the contaminated fluids the highly concentrated hydroxide compound(s) are very effective at quickly remediating $H_2S$ in the treated fluids down to safe, acceptable levels.

The previously proposed treatment compositions may also include small amounts of other chemical compounds depending on the specific characteristics of the contaminated fluids being treated. For example, the previously proposed treatment compositions may include small amounts of one or more organic acids such as fulvic acid and humic acid, which are very effective for preventing substances that are formed from the remediated $H_2S$, as well as other contaminants, from precipitating out of the treated fluids; a chelating agent such as ethylenediaminetetraacetic acid (EDTA) which increases the efficiency of hydroxide compounds in remediating $H_2S$ and may help remediation of $H_2S$ in the treated fluids using the treatment compositions to be irreversible; a surfactant such as sodium lauryl sulphate; and a buffering agent such as potassium carbonate.

Generally, treatment processes for treating contaminated gasses such as natural gas are more involved than the treatment processes for treating a contaminated liquid such as crude oil for various reasons. Some additional considerations and problems that may be experienced in treating contaminated gasses are discussed in U.S. Pat. No. 10,913, 911, e.g., it may involve additional treatment steps and equipment for removing water, salts, etc., in addition to a step of remediating $H_2S$ and other contaminants with the treatment compositions.

The present inventor has also previously proposed treatment processes involving use of his aqueous based treatment compositions for remediating contaminants in a mixture or mixed stream of fluids. See International Patent Application No. PCT/US2021/058610, the entire contents of which are incorporated herein by reference. As disclosed in PCT/US2021/058610, when the previously proposed treatment compositions and variations thereof are used for treating a mixture of contaminated fluids or a continuously flowing stream of a mixture of fluids contaminated with $H_2S$ and other contaminants, e.g., a continuously flowing mixture of crude oil, produced water and natural gas from a well, such fluid mixture stream may be efficiently and effectively treated for remediation of the $H_2S$ and other contaminants by adding appropriate dosage(s) of a treatment composition such as those disclosed in PCT/US2018/064015 and U.S. Pat. No. 10,913,911, as well as variations thereof, to the fluid mixture. Dosages of the previously proposed treatment compositions may be added to the contaminated fluid mixture as it is extracted from a well and/or after the fluids have been separated by a separator, and particular numbers and sizes of the dosages can be optimized for any given contaminated fluid mixture or mixed fluid stream. If the treatment composition(s) are added to a fluid mixture stream, the treatment composition combines and reacts with the fluid mixture as flow in a pipeline or other transportation means to a refinery or other destination, e.g., typically for many miles and over a period an hour or more, whereby the treatment compositions will react with and remediate the $H_2S$ and other contaminants in each of the mixed fluids such that the content of these contaminants will be significantly reduced by the time the fluid mixture arrives at the refinery or other destination. Also, very importantly essentially no precipitates will be discharged from the treated fluid mixture stream if the dosage amount of the treatment compositions added to the stream of mixed contaminated fluids is carefully controlled based on pH as explained in PCT/US2021/058610. The inventor has determined that even if the contaminated fluid mixture stream contained a relatively high content of $H_2S$ when it is extracted from the well, e.g., 40,000 ppm, 60,000 ppm and higher for the entire fluid mixture stream, by treating the fluid mixture according to the treatment process discloses in PCT/US2021/058610 the content of the $H_2S$ in the liquid portion of the stream, e.g., crude oil and produced water, may be reduced down below 5 ppm and the content of the $H_2S$ in the gaseous portion of the mixture, e.g., natural gas, may be reduced to about ⅓ to ½ of its original value prior to treatment.

Figure 1:
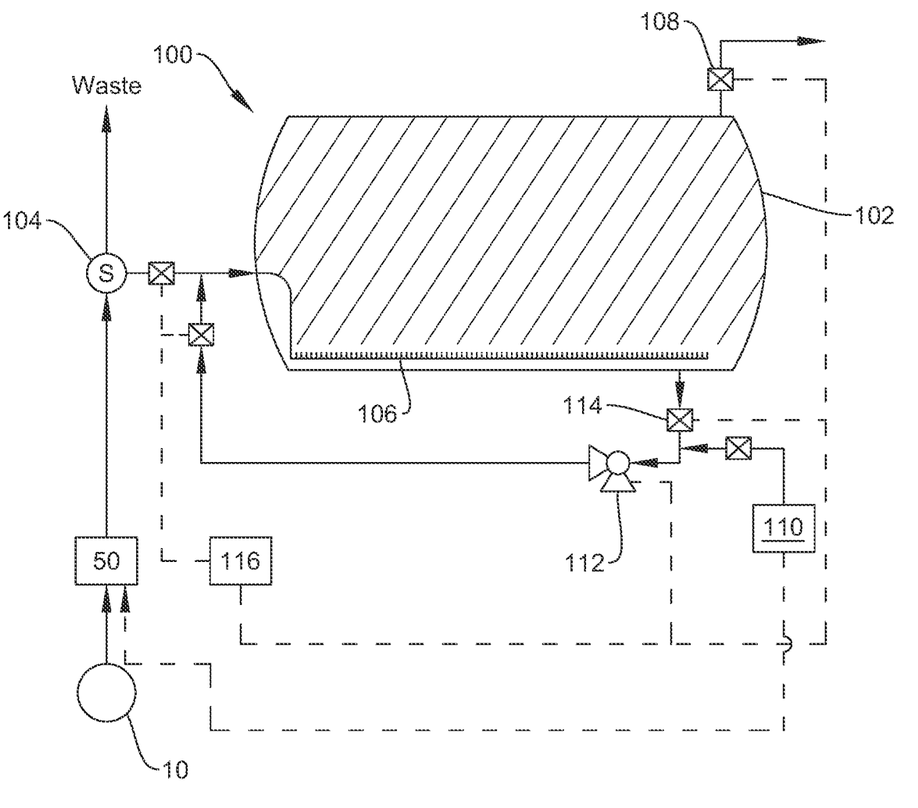

For purposes of adding additional dosages of the treatment composition to the oil and gas mixture stream, this may occur whether or not the mixed fluids are passed through a separator to remove the liquid water component of the fluid mixture. In either event, this may simply involve injecting the additional dosage(s) of the treatment composition into the stream at one or more locations along its flowpath. For a more uniform blending of the treatment composition into the fluid mixture stream, however, the inventor has also proposed using a reaction chamber such as shown in the single drawing of the present application in which the contaminated fluid stream and the treatment composition are introduced and mixed together into a substantially homogeneous mixture which is then discharged into another pipeline or other transportation means.

An important discovery made by the inventor relating to the previously proposed treatment process of PCT/US2021/058610 is that if the pH of the treated fluid mixture is raised to a value above 10 based on the addition of the previously proposed treatment compositions, even in small or localized portions of the mixture where the treatment composition is added, this may likely cause some precipitates, including salts, rag contaminants, etc., to be released from the treated fluid mixture stream, which would be undesirable. The inventor has determined that when the treatment composition is added to the fluid mixture stream, the dosage amount(s) of the treatment composition added to the mixture should be appropriate for raising pH of the fluid mixture stream from a typical initial pH value of 5-6 to a pH value between 9.0 and 10 in the localized portions of the fluid mixture to which the treatment composition(s) are added, preferably between 9.5 and 10, for achieving optimum results and without formation and release of any precipitates, but if the pH is raised above 10 this can lead to release of precipitates. After the dosage(s) of the treatment compositions have fully reacted with the fluid mixture the pH of the treated fluid mixture may typically be around 7 (neutral) or slightly above 7.

Appropriate dosage amounts of such treatment composition(s) for treating contaminants in a mixed fluid stream according to the previously proposed treatment process will be based on the amount of the fluid mixture stream being treated, as well as other factors, including specific composition of the mixed fluid stream, the amounts of different contaminants in the fluids and pH. For a typical oil well having an output of 500-10,000 barrels of crude oil and 10 million to 20 million $ft^3$ of natural gas/day (24 hours) and wherein the $H_2S$ content of the mixed fluid is 30.000 ppm or higher, the inventor has found that an appropriate dosage amount of the previously proposed treatment compositions may be in a range of 5 to 20 gallons of treatment composition added per hour or 120-480 gallons per day. Of this dosage amount, a portion such as ¼ to ¾ of the total amount may be added in initial dosage(s) to the fluid mixture stream essentially as it is extracted from the earth, and the balance may be added to the treated mixture in further dosage(s) at other location(s) downstream, whether or not the fluid mixture is passed through a separator. Adding the further dosage(s) of the treatment composition after the liquid, water based components are separated out, can be more efficient than adding the further dosages to the fluid mixture that still includes the liquid water based components or adding all of the treatment composition at one time. The inventor has determined that under these conditions the treated crude oil in the final fluid mixture stream will be reduced to less than 5 ppm $H_2S$ and often 0 ppm $H_2S$, while the treated natural gas in the mixed fluid will be reduced by 50 to 70% and will typically have less than 15,000 ppm $H_2S$.

While the present inventor's previously proposed treatment compositions and treatment processes using such treatment compositions have proven to be far more efficient and effective at remediating $H_2S$ and other contaminants in various fluids, including crude oil, produced water and natural gas, as well as in mixtures of contaminated fluids in comparison to other treatment compositions and treatment processes conventionally known prior to the inventor's proposals, there is still great demand in the art for the inventor's previous proposals to be improved upon in terms of effectiveness and efficiency in remediating contaminated fluids individually and fluid mixtures.

SUMMARY OF THE INVENTION

An object of the present invention is to satisfy the discussed demand.

The present inventor has carefully investigated this, and has discovered new treatment compositions and treatment processes which, in comparison to the inventor's previously proposed treatment compositions and processes, are more effective, efficient and economically practical for quickly remediating and/or removing $H_2S$, $CO_2$ and other contaminants in various contaminated fluids and fluid mixtures down to safe, acceptable levels in an efficient, cost-effective manner, whether the contaminated fluids are treated individually or when mixed together.

One discovery made by the present inventor pertains to new hydrocarbon liquid based treatment compositions including one or more hydrocarbon based liquids, and a relatively high collective concentration of one or more hydroxide compounds dissolved or dispersed into the hydrocarbon based liquid(s), e.g., 30-45 wt %, and optionally one or more other components as discussed herein. The hydrocarbon based liquids used in the new treatment composition(s) may include a wide variety of liquids as discussed herein, but in general give the treatment composition an increased vapor pressure compared to the inventor's previously proposed water based treatment compositions. The inventor has determined that such treatment compositions can be more effective and efficient at remediating $H_2S$ and other contaminants in various contaminated fluids and mixtures of the contaminated fluids in sortie situations in comparison to the inventor's previously proposed water based treatment compositions, including those discussed herein, and the new hydrocarbon liquid based treatment compositions may be more effective at preventing formation and release of precipitates from the treated fluids in comparison to the inventor's previously proposed water based treatment compositions. Because the new treatment compositions include the hydrocarbon based liquids, they are significantly different from the inventor's previously proposed treatment compositions which are aqueous based liquid compositions not including any hydrocarbon based liquids. The new treatment composition(s) may include other components, including other components included in the inventor's previously proposed water based treatment compositions, which may depend on the particular contaminated fluid(s) being treated. Further, if the new hydrocarbon liquid based treatment compositions also include some amount of water, even up to 50 volume %, of water, the inventor has determined that for remediating some contaminated fluids or fluid mixtures, the new compositions may still be more effective and efficient at remediating $H_2S$, $CO_2$ and some other contaminants, and for preventing formation and release of precipitates in various contaminated fluids and mixtures of the contaminated fluids in comparison to the inventor's previously proposed water based treatment compositions.

A wide variety of hydrocarbon based liquids may be used in the new treatment compositions, including relatively light liquid(s) including alcohols, toluene, hexane, xylene, and others, as well as mixtures of these liquids, provided that the hydroxide compound(s) and any other components to be included in the treatment compositions may be fully dissolved or dispersed into the hydrocarbon based liquids. Alcohols are appropriate for use as the hydrocarbon liquids because they are polar so that other components of the treatment composition(s) are generally dissolvable and/or miscible therein. Lighter alcohols, including methanol ($CH_3OH$), ethanol ($C_2H_5OH$), and n-propyl alcohol ($C_3H_8O$), may be more appropriate based on lower cost and/or higher vapor pressure. Toluene, hexane, xylene are also appropriate as the hydrocarbon liquids because the hydroxide compounds and other components are dissolvable or dispersible therein, as they have relatively high vapor pressures which is desirable because more of the reactive hydroxide compound(s) may be contained in the vapors where they can better react with gaseous contaminants including $H_2S$ and $CO_2$. Other hydrocarbon liquids besides alcohols, toluene, hexane, and xylene may also be used provided that the hydroxide compound(s) and other components may be dissolved or dispersed therein. Also, the hydrocarbon liquids should have higher vapor pressures than water.

By using a hydrocarbon based liquid as a base solvent for the treatment composition, the vapor pressure of the treatment composition at standard temperature and pressure (STP) may be greater than the vapor pressure of the inventor's previously proposed water based treatment compositions at STP. Correspondingly, more of the treatment composition may be in vapor phase and may correspondingly have greater contact with contaminants including $H_2S$ and $CO_2$, which tend to be in vapor phase at STP, even when the $H_2S$ and $CO_2$ are in a mixed fluid stream containing liquid and gaseous fluids, and can more effectively and efficiently remediate the $H_2S$ and $CO_2$. When contaminated fluids such as crude oil, produced water and natural gas are extracted from the earth though a well, the fluids may be at a temperature of 90 to 120° F. by the time the fluids reach the earth's surface, but as the fluids flow through a pipeline toward a separator, refinery or other destination they will cool down to ambient temperature surrounding the pipeline, such that it is important that the treatment composition can be effective at remediating contaminants including $H_2S$ and $CO_2$ at STP. The new treatment compositions are effective for remediating $H_2S$, $CO_2$ and other contaminants in contaminated fluids at STP, but the remediation reaction(s) may proceed more quickly at elevated temperatures.

Generally, all hydroxide compounds may be used provided they can be dissolved or dispersed in the hydrocarbon liquid(s) of the all composition. However, some hydroxide compounds have lower cost, e.g., NaOH and KOH, and if used may make the composition and treatment processes using the composition more economically advantageous. Also, if the treatment composition is to be used with fluids such as crude oil and/or natural gas which include significant amounts of NaCl, which will typically be dissolved in any water included in the fluids, it may be desirable to use little or no NaOH to help prevent causing any salt to precipitate out of the treated fluids. The treatment composition may include 30-50 wt % collectively of one or more hydroxide compound(s). It is important that components of the composition other than the hydrocarbon liquid(s) should be dissolvable, dispersable and/or miscible in the hydrocarbon based liquid(s) used in the treatment composition as there should be no precipitates or the like from the treatment composition itself when used in the treatment processes of the present invention.

The new treatment compositions may include water, even a significant amount of water up to 50 volume %, but presence of water in the treatment compositions may increase the possibility of precipitates being formed and released from the fluids being treated, which is undesirable in many situations. Hydroxides tend to bond more strongly to water than to hydrocarbon liquids, and when the new treatment compositions are added to contaminated fluids containing water together with salts and/or other contaminants dissolved or dispersed in the water, the hydroxides bonded to the water may cause salts and other contaminants to be released from the treated fluids.

The new treatment compositions may also include amounts of other chemical compounds depending on the specific characteristics of the contaminated fluids being treated and desired results, including whether there is concern over formation and release of precipitates in—from the treated fluids, but the amounts of these other chemical compounds will be significantly smaller than the amount of the hydroxide compound(s) in the treatment compositions. For example, the new treatment compositions may include 0.01 to 6 wt %, of one or more organic acids such as fulvic acid and humic acid, which the inventor discovered are very effective for preventing substances that are formed from the remediated $H_2S$, as well as other contaminants, from precipitating out of the treated fluids. The treatment compositions may include 0.01 to 6 wt % of a chelating agent such as ethylenediaminetetraacetic acid (EDTA). Among other things, EDTA increases the efficiency of hydroxide compounds in remediating $H_2S$ and helps to make the remediation of $H_2S$ using the new treatment irreversible. The treatment compositions may also include 0.1 to 8.0 wt % of sodium sulfide ($HNa_2S$) or its hydrate $Na_2S\ 9H_2O$, both of which are colorless solids. The inventor has significantly discovered that including sodium sulfide in the new treatment compositions can be very effective for reducing total sulfur content of contaminated fluids. The treatment compositions may also include a small amount, e.g., 0.5 to less than 5 wt %, preferably less than 2 wt %, of a polymer which can also help prevent precipitates from being released from the treated fluids. An example of such a polymer is a commercially available anionic polymer identified under product code 3640. A surfactant such as sodium lauryl sulphate and a buffering agent such as potassium carbonate may be added in small amounts, e.g., 0.02 to less than 1 wt %.

In terms of water content, again the new treatment composition may include tittle or no water up to 50 volume %. This may be accomplished by dissolving or dispersing the hydroxide compound(s) and other components directly in the alcohol(s) or other hydrocarbon based liquid(s) liquid used as the solvent/base of the treatment composition. For example, the hydroxide compound(s) may be in the form of hydrates such as KOH hydrate and NaOH hydrate, which are solid materials that readily dissolve in alcohols, while the organic acids such as fulvic acid and humic acid, the EDTA and sodium sulfide and its hydrate may also be in forms of a solids or powders that also readily dissolve in alcohols. Polymers such as the 3640 polymer are readily dispersed in alcohols. By dissolving the hydroxide compound(s) and other components directly in the alcohol(s) and/or other hydrocarbon liquid(s) used as a base for the treatment composition, this can keep the amount of water in the treatment composition down to minimum levels such as 5 wt % or less. The less amount of water in the treatment compositions typically makes them more effective and/or efficient for remediating the contaminated fluids.

On the other hand, the inventor has discovered that even if the new treatment compositions include significant amounts of water, e.g., up to about 50 wt %, together with the hydrocarbon based liquids, the treatment compositions may still be very effective at remediating $H_2S$, $CO_2$ and other contaminants in various contaminated fluids and mixtures of contaminated fluids, while the water may help in dispersing other components into the treatment compositions. For example, the inventor has discovered that if the hydroxide compound(s), organic acids such as fulvic acid and humic acid, chelating agents such as EDTA, sodium sulfide and its hydrate and other components of the treatment compositions are initially dissolved or dispersed in water, and then the water solution(s) containing these materials are mixed together with the alcohol(s) and/or other hydrocarbon liquids) used as the base of the treatment composition, the resulting treatment composition may still be very effective and efficient at remediating $H_2S$, $CO_2$ and other contaminants in various contaminated fluids and streams of mixed fluids, as well as for preventing formation and release of precipitates from the treated fluids. Such treatment compositions containing both the hydrocarbon liquids) and water will still have a significantly higher vapor pressure than the inventor's previously proposed treatment compositions which do not include hydrocarbon or hydrocarbon liquid(s).

An example of the new treatment composition may be prepared by dissolving or dispersing into any desired volume of one or more hydrocarbon liquids, such as alcohols including methanol ($CH_3OH$), ethanol ($C_2H_5OH$), and n-propyl alcohol ($C_3H_8O$), toluene, hexane, and xylene, 30-50 wt % collectively of one or more hydroxide compounds including at least one of KOH and NaOH. If desired, 0.01 to 6 wt % of one or more organic acids such as fulvic acid and humic acid, 0.1 to 6 wt % of a chelating agent such as EDTA and 0.1 to 8.0 wt % of sodium sulfide ($HNa_2S$) or its hydrate $Na_2S.9H_2O$ may be included in this treatment composition. Again, the hydroxide compounds may be in solid form such as KOH hydrate and NaOH hydrate, while the organic acids such as fulvic acid and humic acid, the EDTA and sodium sulfide and its hydrate may also be in forms of a solids or powders that also readily dissolve or disperse in these hydrocarbon based liquids. This exemplary treatment composition has a pH of about 14.

As another example, a version of the treatment composition containing one or more of the discussed hydrocarbon liquid(s), as well as a substantial amount of water, may be prepared by combining 15-50% volume of one or more of the hydrocarbon based liquids discussed in the first example, 50-85% volume of an aqueous solution containing 35-55 wt % collectively of one or more hydroxide compounds such as KOH and NaOH. If other chemical compounds are to be included in the treatment composition, which will be in relatively much smaller amounts than the hydrocarbon liquid(s) and the aqueous solution of hydroxide compound(s), then volume percentages will be appropriately adjusted. For example, 0.5 to 8 volume %, of an aqueous solution containing 1-60 wt % of one or more organic acids such as fulvic acid and humic acid, 1 to 10 volume % of an aqueous solution containing 30-60 wt % of a chelating agent such as EDTA and/or an 1-20 volume % aqueous solution containing 15-25 wt % sodium sulfide may be included in the treatment composition, and the relative percentages of the hydrocarbon liquid(s) and hydroxide solution will be proportionately reduced. This exemplary treatment composition also has a pH of about 14.

Another discovery made by the present inventor pertains to exemplary treatment processes for remediating and/or removing $H_2S$, $CO_2$ and other contaminants from various contaminated fluids, including liquids such as crude oil and contaminated water that is extracted with crude oil from a well, gasses such as natural gas, as well as fluid mixtures containing two or more of these fluids using the inventor's new hydrocarbon liquid based treatment compositions. The inventor has discovered that such contaminated fluid mixtures may be efficiently and effectively treated for remediation of the $H_2S$, $CO_2$ and other contaminants by adding appropriate dosage(s) of the new hydrocarbon liquid based treatment composition(s) discussed herein to a contaminated fluid or fluid mixture and allowing time for the compositions to remediate the $H_2S$, $CO_2$ and other contaminants. Further, the inventor has discovered that the compositions may be used to remediate a contaminated fluid mixture in the form of a flowing stream, e.g., a stream containing all three discussed fluids being extracted from a well and flowing toward a refinery or other destination, by adding appropriate dosage(s) of the composition(s) to the flowing stream, such that contaminants in all of the mixed fluids will be simultaneously remediated. In this regard, the inventor has discovered that treating a fluid mixture containing both liquid and gaseous fluids, the treatment process of the present invention achieves significantly greater efficiency than when treating the contaminated fluids individually because the liquid fluid(s) in the mixture being treated advantageously function as a medium to contain the treatment composition(s) for enhancing contact with gaseous fluid(s) of the contaminated mixture. Also, very importantly specific formulations of the treatment compositions can be tailored to assure that little or no precipitates will be discharged from the treated fluid mixture stream as it flows with the treatment composition added thereto, e.g., by including organic acids such as fulvic acid and humic acid and/or polymers such as the 3640 polymer in the compositions. The inventor has determined that even if the contaminated fluid mixture contains a relatively high content of $H_2S$ and $CO_2$ when it is extracted from the well, e.g., 60,000 ppm and higher for $H_2S$ and 40,000 and higher for $CO_2$, the content of the $H_2S$ and $CO_2$ in the liquid portion of the mixture, e.g., crude oil and produced water, may be reduced down below 5 ppm, and the content of the $H_2S$ and $CO_2$ in the gaseous portion of the mixture, e.g., natural gas, may be reduced by 60% or more through the present treatment process.

For effecting such treatment process, the inventor has determined that the treatment composition may be added to the fluid mixture as it is extracted from the well and is flowing toward a separator or other destination so that treatment composition may remediate some of the $H_2S$, $CO_2$ and some other contaminants in all three fluids of the fluid mixture. Dosage(s) of the treatment composition(s) may alternatively or additionally be added to a mixture of the crude oil and natural gas after the fluid mixture has passed through a separator to remove liquid, water based component. Of course, it is possible to add the treatment composition(s) according to the present invention to a single contaminated fluid such as crude oil or natural gas, but treating just the natural gas can be significantly more complicated and expensive because the liquid treatment composition(s) do not intimately combine with contaminated gases as they do with contaminated liquids, even if the treatment compositions contain little or no water. The inventor has discovered that treating the contaminated natural gas when it is combined with one or more contaminated liquids such as crude oil and produced water and flowing together in a pipeline is much more efficient because the contaminated liquid(s) function as a means for containing the treatment composition(s) in the flowing fluids whereby there will be substantial contact between the treatment compositions and the natural gas permitting efficient remediation of the contaminated natural gas.

The inventor has also discovered that when the new hydrocarbon liquid based treatment composition(s) are added to a contaminated fluid mixture or mixture stream it is very important to control and monitor pH of the mixed fluid stream being treated in order to prevent formation and/or release of precipitates therefrom. A typical fluid mixture extracted from an oil/gas well may have an initial pH value of 5-6, but due to the highly alkaline nature of the new hydrocarbon liquid based treatment composition(s) the pH of the mixed fluid stream will increase when the treatment composition(s) are added thereto, particularly in small, localized pockets of the fluid stream where the water based treatment composition(s) are added to the stream. Very significantly, however, the inventor has discovered that when using the new hydrocarbon liquid based treatment composition(s) for treating the mixed fluid stream, rather than using one of the inventor's previously proposed water based treatment compositions as are used in the treatment process of PCT/US2021/058610, it is appropriate for the pH of the treated mixed fluid stream to be increased to a higher value above 10 without causing formation and/or release of precipitates from the mixed fluid stream. For example, in the treatment process disclosed in PCT/US2021/058610 the pH of the treated fluid stream should not be increased to a value above about 10, even in small, localized pockets of the fluid stream where the water based treatment composition(s) are added to the stream, in order to prevent formation and/or release of precipitate(s) from the mixed fluid stream. However, with the treatment process using the new hydrocarbon liquid based treatment composition(s) the pH of the treated mixed fluid stream may be increased to a value above 12 without causing formation and/or release of precipitates from the mixed fluid stream. The inventor has discovered that in the treatment process using the new hydrocarbon liquid based treatment composition(s) there is little concern about formation and/or release of precipitates until the pH is increased to about 12.5, including in small, localized pockets of the fluid stream where the water based treatment composition(s) are added to the stream.

The ability to increase the pH of the treated, mixed fluid stream to above 12 in the new treatment process advantageously allows for more of the new hydrocarbon liquid based treatment composition(s) to be added to the mixed fluid stream overall and in various dosages without concern that precipitates may be formed and/or released, as compared to the treatment process disclosed in PCT/US2021/058610 using the inventor's previously proposed, water based treatment compositions. Based on the higher pH the new treatment process can achieve a greater and/or more efficient level of remediation of $H_2S$, $CO_2$ and some other contaminants in the mixed fluid stream compared to the treatment process disclosed in PCT/US2021/058610, and this leads to the new treatment process achieving greater effectiveness and greater efficiency in remediating the contaminants in the mixed fluids.

For appropriately controlling pH of the mixed fluid stream in the treatment process of the present invention, the inventor has determined that it is also advantageous to add or inject the treatment composition to the mixed fluid stream in multiple smaller dosages and/or at multiple locations and/or at different times, so that no portion of the treated fluids will experience even a temporary pH increase above 12.5 because this may result in release of precipitates. In other words, it is desirable that the entire dosage amount of the new hydrocarbon liquid based treatment composition should not be injected at a single location and/or at a single time as this may likely result in the pH of the mixed fluid stream, or the pH of a portion of the mixed fluid stream, being raised above 12.5 temporarily. Even a temporary increase in the pH above 12.5 may cause undesirable formation and/or release of precipitates from the treated fluid stream. The specific dosage amounts may be determined based on pH of the mixed fluid stream, which may also be monitored at multiple locations along the flowpath of the mixed fluid stream. The pH of the treated mixed fluid stream may generally corresponds to the remaining, non-reacted amount of the new treatment composition remaining in the mixed fluid stream, and correspondingly such monitoring of the pH allows for further appropriate dosage amount(s) of the treatment composition to be added to the mixed fluid stream, if necessary, as it continues to flow toward a refinery or other destination. By adding smaller dosage amounts of the treatment composition to the mixed fluid stream at multiple locations and/or at different times permits more of the treatment composition to be added to the mixed fluid stream without concern for causing formation and/or release of precipitates. This also leads to the new treatment process achieving greater effectiveness and greater efficiency in remediating $H_2S$, $CO_2$ and the other contaminants in the mixed fluid stream in comparison to all other known treatment processes, including the treatment processes involving inventor's water based treatment compositions.

Intent of Disclosure

Although the following disclosure of exemplary embodiments of the invention offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

BRIEF DESCRIPTION OF DRAWINGS

The single drawing FIGURE is a schematic diagram of a system for remediating a contaminated fluid mixture according to an exemplary embodiment of the present invention.

DETAILED DESCRIPTION OF PRESENT EXEMPLARY EMBODIMENTS

Exemplary embodiments of the present invention will be described below. Primary aspects of the present invention include novel hydrocarbon liquid based treatment compositions and treatment processes involving use of the treatment compositions for remediating contaminated fluids, including liquids, gasses and mixtures of such fluids. A treatment processes according to the present invention may simply involve directly injecting the hydrocarbon liquid based treatment composition(s) into the contaminated fluids, but the treatment processes may optionally involve a treatment system such as shown in the single drawing FIGURE.

New Hydrocarbon Liquid Based Treatment Compositions

New hydrocarbon liquid based treatment compositions according to exemplary embodiments of the present invention include one or more hydrocarbon based liquids and a relatively high collective concentration of one or more hydroxide compounds dissolved or dispersed into the hydrocarbon based liquid(s), e.g., 30-45 wt %, and optionally one or more other components as discussed herein. The hydrocarbon based liquids used in the new treatment composition(s) give the treatment composition an increased vapor pressure compared to the inventor's previously proposed water based treatment compositions. The inventor has determined that such treatment compositions can be more effective and efficient at remediating $H_2S$ and other contaminants in various contaminated fluids and mixtures of the contaminated fluids in some situations in comparison to the inventor's previously proposed water based treatment compositions, including those discussed herein, and the new hydrocarbon liquid based treatment compositions may be more effective at preventing formation and release of precipitates from the treated fluids in comparison to the inventor's previously proposed water based treatment compositions, which can be very important. The new treatment compositions are effective for remediating contaminants in the treated fluids over a wide range of temperatures, e.g., −30° C. to 300° C., and over a wide range of pressures, e.g., from pressures below atmospheric pressure to several atmospheres, including at STP. Also, the new treatment compositions The new treatment compositions including the hydrocarbon based liquids are significantly different from the inventor's previously proposed treatment compositions which are water based liquid compositions not including any hydrocarbon based liquids. However, other components of the treatment compositions may be the same or similar to components included in the inventor's previously proposed water based treatment compositions.

For example, the new treatment composition may also contain various amounts of water, from little or none up to 50 wt % of water, and the water may be helpful for readily dissolving or dispersing the hydroxide compound(s) and other optional components into the hydrocarbon based liquids. If the new hydrocarbon liquid based treatment compositions also include some amount of water, even a significant amount, of water, the inventor has determined that for remediating some contaminated fluids or fluid mixtures, the new compositions may still be more effective and efficient at remediating $H_2S$, $CO_2$ and some other contaminants, and for preventing formation and release of precipitates in various contaminated fluids and mixtures of the contaminated fluids in comparison to the inventor's previously proposed water based treatment compositions. Further, when treating contaminated crude oil and contaminated natural gas from a well, these will typically include some amount of water therein, so that including additional water in the treatment compositions may be appropriate. Such treatment compositions containing both the hydrocarbon liquid(s) and water will still have a significantly higher vapor pressure than the inventor's previously proposed treatment compositions which do not include hydrocarbon based liquid(s). Presence of water in the treatment compositions may increase the possibility of precipitates being released from the fluids being treated in some situations. Hydroxides tend to bond more strongly to water than to hydrocarbon liquids, and when the new treatment compositions are added to contaminated fluids containing water together with salts and/or other contaminants dissolved or dispersed in the water, the hydroxides bonded to the water may cause salts and other contaminants to be released from the treated fluids.

Whether the treatment compositions include the other chemical compounds may depend on the specific characteristics of the contaminated fluids being treated and desired results, including whether or not formation and release of precipitates from the treated fluids is desired to occur or be prevented. Other possible components of the treatment compositions include: one more organic acids such as fulvic acid and humic acid; polymers such as an anionic polymer with product code 3640; chelating agents such as EDTA; and sodium sulfide ($HNa_2S$). For example, the new treatment compositions may include 0.01 to 6 wt % collectively of one or more organic acids such as fulvic acid and humic acid, which the inventor has discovered are very effective for preventing substances that are formed from the remediated $H_2S$, as well as other contaminants, from precipitating out of the treated fluids. Use of such organic acids is further discussed in PCT/US2018/064015, and in U.S. Pat. No. 10,913,911 relative to the inventor's previously proposed water based treatment compositions, but the discussion also applies to the new treatment compositions.

The treatment compositions may include 0.01 to 6 wt % of a chelating agent such as ethylenediaminetetraacetic acid (EDTA). Among other things, EDTA increases the efficiency of hydroxide compounds in remediating $H_2S$ and helps to make the remediation of $H_2S$ using the new treatment irreversible. However, if the fluids being treated include significant amount of salt(s), amounts of EDTA in the higher end of the discussed range may react with the salt(s) to form a gel which precipitates out of the treated fluids, which would typically be undesirable because the gel could cause blockages of pipelines in which the fluids are flowing and would have to be removed. Further, if the gel remains in a pipeline or other device through which the fluids are flowing or being transported over an extended period of time the gel may solidify making removal of the gel more difficult.

The treatment compositions may also include a small amount, e.g., 0.1 to less than 5 wt % and preferably less than 2 wt %, of a polymer which can help to prevent any salts in the fluids being treated from precipitating out of the treated fluids. An example of such a polymer is a commercially available anionic polymer identified under product code 3640. The inventor believes that such polymer and other similar polymers may encapsulate the salts within the fluids being treated and this prevents or helps to prevent the salts and other contaminants from precipitating out of the treated fluids.

The treatment compositions may also include 0.1 to 8.0 wt % of sodium sulfide ($HNa_2S$) or its hydrate $Na_2S.9H_2O$, both of which are colorless solids. While it may seem counter-intuitive to add sodium sulfide for the purpose of reducing sulfur content of the contaminated fluids, the present inventor has discovered that addition of sodium sulfide or its hydrate to the treatment compositions can help to reduce total sulfur content in various contaminated fluids, including liquids and gasses being treated with the treatment compositions. Particularly, the inventor has discovered that in the treatment compositions sodium sulfide promotes reactions with sulfur and sulfur containing compounds whereby the sulfur is largely converted to sulfur dioxide ($SO_2$) which is generally released from the treated fluids in gaseous form at standard temperature and pressure (STP), although including the sodium sulfide in the treatment compositions may also cause the formation and release of comparatively smaller amounts of a sulfur containing precipitate, which the inventor has identified using a gas chromatograph as $C_{18}$, $H_8N_4O_5S_2$. $SO_2$ is an irritant to humans and would be captured and or further treated, while the precipitate would be removed if and when necessary from a pipeline or other structure in which the treated fluids are contained or flowing. Sodium sulfide and its hydrate readily dissolve in water, e.g., at concentrations of 15-25 wt %, and in the hydrocarbon based liquids used in the treatment compositions of the present invention.

A surfactant such as sodium lauryl sulphate and a buffering agent such as potassium carbonate may be included in small amounts, e.g., less than 1 wt %, in the new treatment compositions.

By using a hydrocarbon based liquid as a base solvent for the new treatment compositions, the vapor pressure of the treatment compositions at STP will be greater than the vapor pressure of the inventor's previously proposed water based treatment compositions at STP. Correspondingly, more of the treatment composition will be in vapor phase and may correspondingly have greater contact with contaminants including $H_2S$ and $CO_2$, which tend to be in vapor phase at STP, even when the $H_2S$ and $CO_2$ are in a fluid mixture containing liquid and gaseous fluids. Thus, the new compositions can more effectively and efficiently remediate the contaminants that tend to be in gaseous or vapor phase at STP including $H_2S$ and $CO_2$. When contaminated fluids such as crude oil, produced water and natural gas are extracted from the earth though a well, the fluids may be at a temperature of 90 to 120° F. by the time the fluids reach the earth's surface, but as the fluids flow through a pipeline toward a separator, refinery or other destination they will cool down to ambient temperature surrounding the pipeline, such that it is important that the treatment composition can be effective at remediating contaminants including $H_2S$ and $CO_2$ at STP. The new treatment compositions are effective for remediating $H_2S$, $CO_2$ and other contaminants in contaminated fluids at STP, but the remediation reaction(s) in treatment processes involving the treatment compositions may proceed more quickly at elevated temperatures.

A wide variety of hydrocarbon based liquids may be used in the new treatment compositions, including relatively light liquid(s) including alcohols, toluene, hexane, xylene, and other hydrocarbon based liquids having vapor pressures greater than water, as well as mixtures of these liquids, provided that the hydroxide compound(s) and other possible components of the treatment compositions may be dissolved of dispersed therein. Alcohols are appropriate for use as the hydrocarbon liquids because they are polar so that other components of the composition are generally readily dissolvable and/or miscible therein. Lighter alcohols, including methanol ($CH_3OH$), ethanol ($C_2H_5OH$), and n-propyl alcohol ($C_3H_8O$), may be more appropriate based on lower cost and/or higher vapor pressure. Toluene, hexane, xylene and other such liquids which are often used as solvents may also be used as the hydrocarbon liquids as they have relatively high vapor pressures which is desirable because more of the reactive hydroxide compound(s) may be contained in the vapors where they can better react with gaseous contaminants including $H_2S$ and $CO_2$. Hydroxide compounds and other possible components of the treatment compositions may also dissolve or disperse into these liquids. It is important that components of the composition other than the hydrocarbon liquid(s) should be dissolvable, dispersable and/or miscible in the hydrocarbon based liquid(s) used in the treatment composition as there should be no precipitates or the like from the treatment composition itself when used in the treatment processes of the present invention.

Generally, all hydroxide compounds may be used provided they can be dissolved or dispersed in the hydrocarbon liquid(s) of the all composition. However, some hydroxide compounds have lower cost, e.g., NaOH and KOH, and if used may make the composition and treatment processes using the composition more economically advantageous. If the treatment composition is to be used to treat fluids such as crude oil and/or natural gas which include significant amounts of salts including NaCl, which will typically be dissolved in any water included in the fluids, it may be desirable to use little or no NaOH to help prevent causing any salt to precipitate out of the treated fluids. The treatment composition may include 30-50 wt % collectively of one or more hydroxide compound(s).

Including water together with the hydrocarbon based liquids in the treatment compositions of the present invention may facilitate dissolving or dispersing the hydroxide compounds and other possible components into the new compositions. However, if it is desired that the treatment compositions contain little or no water, the hydroxide compound(s) and other possible components may be directly dissolved and/or dispersed in the alcohol(s) or other hydrocarbon based liquid(s) liquid used as the solvent/base of the treatment composition. For example, the hydroxide compound(s) may be in the form of hydrates such as KOH hydrate and NaOH hydrate, which are solid materials, while the organic acids such as fulvic acid and humic acid, chelating agents such as EDTA and sodium sulfide or its hydrate may also be in forms of a solids or powders, all of which readily dissolve in alcohols and the other discussed hydrocarbon based liquids which may be used in the new treatment compositions. Polymers such as the 3640 polymer are readily dispersed in alcohols. By dissolving and/or dispersing the hydroxide compound(s) and other components directly in the alcohol(s) and/or other hydrocarbon liquid(s) used as a base for the treatment composition, this can keep the amount of water in the treatment composition down to minimum levels such as 5 wt % or less. The less amount of water in the treatment compositions the more effective and/or efficient the treatment compositions may be for remediating some contaminated fluids.

However, the inventor has discovered that even if the new treatment compositions include significant amounts of water, up to about 50 wt %, together with the hydrocarbon based liquids, the treatment compositions may still be very effective at remediating $H_2S$, $CO_2$ and other contaminants in various contaminated fluids and mixtures of contaminated fluids. For example, if the hydroxide compound(s) and other possible components including organic acids such as fulvic acid and humic acid, chelating agents such as EDTA, sodium sulfide, etc. are initially dissolved or dispersed in water, then the water solution(s) containing these materials may be mixed together with the alcohol(s) and/or other hydrocarbon liquid(s) used as the base of the treatment compositions, and the resulting treatment compositions may still be very effective and efficient at remediating $H_2S$, $CO_2$ and other contaminants in various contaminated fluids and fluid mixtures, as well as for preventing formation and release of precipitates from the treated fluids. When the treatment composition include water, e.g., to facilitate dissolving or dispersing the hydroxide compounds and other components into the treatment compositions, the water content may be reduced or minimized by dissolving of dispersing the hydroxide compound(s) and other components at relatively high concentrations in the water. Hydroxide compositions such as NaOH and KOH may be dissolved at high concentrations of 35-55 wt % in water, while organic acids such as fulvic acid and humic acid, and chelating agents such as EDTA may also be dissolved at concentrations above 40 wt % in water.

Examples of the New Treatment Compositions

A first exemplary embodiment of the new treatment composition according to the present invention may be prepared by dissolving or dispersing into any desired volume of one or more hydrocarbon liquids, such as alcohols including methanol ($CH_3OH$), ethanol ($C_2H_5OH$), and n-propyl alcohol ($C_3H_8O$), toluene, hexane, xylene and mixtures of these liquids, 30-45 wt % collectively of one or more hydroxide compounds including at least one of KOH and NaOH. Again, the hydroxide compounds may be in solid form such as KOH hydrate and NaOH hydrate that readily dissolve or disperse in these hydrocarbon based liquids. This exemplary treatment composition has a pH of about 14 and can be used for remediating various contaminated fluids, including liquids such as crude oil, refined petroleum products and produced water, gasses such as natural gas, and mixtures of such fluids. Treatment processes for treating contaminated fluids using the new treatment compositions are discussed below.

A second exemplary embodiment of the new treatment composition, is similar the first exemplary embodiment, but further includes a significant amount of water. This composition may be prepared by initially dissolving appropriate amount(s) of the hydroxide compound(s) in water to form an aqueous hydroxide solution and then combining appropriate volumes of such solution with one or more of the hydrocarbon base liquids used in the first exemplary embodiment. For example, 15 50% volume of one or more of the hydrocarbon based liquids discussed in the first example may be combined with 50-85% volume of an aqueous solution containing 35-55 wt % collectively of one or more hydroxide compounds including at least one of KOH and NaOH. This exemplary treatment composition also has a pH of about 14.

Each of the above embodiments of the treatment compositions according to the present invention may be modified by addition of one or more other components, including those discussed above. Particularly, these exemplary treatment compositions may include one or more of 0.01 to 6 wt % of one or more organic acids such as fulvic acid and humic acid; 0.1 to 6 wt % of a chelating agent such as EDTA; 0.1 to less than 5 wt % and preferably less than 2 wt %, of a polymer such as the anionic polymer with product code 6340; 0.1 to 8.0 wt % of sodium sulfide; 0.01 to less than 1 wt % of a surfactant such as sodium lauryl sulphate; and 0.01 to less than 1 wt % of a buffering agent such as potassium carbonate. Addition of one or more of these other components to the treatment compositions largely depends on the particular contaminated fluid or fluid mixture being treated and whether or not it is desired for precipitate(s) to be released from the treated fluid(s).

Organic acids such as fulvic acid and humic acid, chelating agent such as EDTA, and sodium sulfide may all be in forms of a solids or powders, which can be dissolved directly into the hydrocarbon liquids in the first or second embodiments in appropriate amounts within the discussed weight ranges. Alternatively, the solids or powders of such components may first be dissolved into water to form aqueous solutions of the components, and then appropriate volumes of the aqueous solutions may be added into the treatment compositions of the first or second embodiments. For example, an aqueous solution containing 1-60 wt % of one or more organic acids such as fulvic acid and humic acid may be prepared, and 0.5 to 8 volume % of such aqueous solution may be added to 92-99.5 volume % of the treatment composition according to either of the first or second embodiments. Similarly, an aqueous solution containing 30-60 wt % of a chelating agent such as EDTA may be prepared and 1 to 10 volume % of such aqueous solution may be added to 90-99 volume % of the treatment composition according to either of the first or second embodiments. Also, an aqueous solution containing about 15-20 wt % sodium sulfide may be prepared and 1 to 20 volume % of such aqueous solution may be added to 80-99 volume % of the treatment composition according to either of the first or second embodiments.

Polymers including anionic polymer 3640 typically come in aqueous solutions or emulsions which can added in appropriate amounts to the treatment compositions, a surfactant such as sodium lauryl sulphate and a buffering agent such as potassium carbonate may also be provided in aqueous solutions which can be added in appropriate amounts to the treatment compositions.

New Treatment Processes Involving the New Hydrocarbon Liquid Based Treatment Compositions The new hydrocarbon liquid based treatment compositions according to the present invention may be used to treat or remediate individual contaminated fluids, whether liquid or gaseous, as well as mixtures of fluids. Treatment processes according to the present invention can treat the contaminated fluids in batch mode or continuous mode. Batch mode may simply involve adding appropriate dosage(s) of the treatment composition(s) to given volumes of contaminated fluids or fluid mixtures and permitting the treatment compositions to react with the contaminated fluids for appropriate periods of time, which can be a matter of seconds or minutes up to several hours or days, noting that remediation of $H_2S$, $CO_2$ and some other contaminants can happen very quickly due to the high concentration of hydroxide compound(s) in the treatment compositions, but may take some time for achieving sufficient contact between gaseous contaminated fluids and the treatment compositions. Continuous mode treatment processes may involve adding dosage(s) of the treatment composition(s) to flowing streams of contaminated fluids or fluid mixtures in pipelines or the like and then permitting the treatment compositions to react with the contaminated fluid(s) streams as they continue to flow along the pipelines. In batch or continuous modes remediation reactions with $H_2S$, $CO_2$ and some other contaminants in the contaminated liquid fluids can happen very quickly due to the high concentration of hydroxide compound(s) in the treatment compositions because the liquid treatment compositions intimately mix with and contact the contaminated liquids.

With contaminated gasses, continuously bubbling the gasses though a volume of the liquid treatment composition(s) contained in a reactor or reaction tower may also happen very quickly, e.g., in 1-2 seconds, because there will be significant contact between the gasses and the liquid compositions in such arrangement. It is important to get sufficient contact between the gasses and the treatment compositions, e.g., at least one second, which can be achieved by adjusting the pressure of the gasses and/or the vertical height of the treatment composition(s) contained in a reactions chamber or tower. Also, it is generally desirable to break up streams of the contaminated gasses into bubbles, e.g., by using various baffles or packings in the reactions chamber or tower. However, for treating a continuously flowing stream of contaminated gas by simply injecting dosage(s) of the liquid treatment compositions into the gas stream may take significantly longer to remediate the contaminants in the gasses because the liquid compositions do not intimately mix with or contact the flowing gases. In this regard, however, the inventor has discovered that the contaminated gasses may be much more efficiently remediated using the treatment compositions according to the present invention by simultaneously treating a fluid mixture containing the contaminated gasses together with at least one contaminated liquid because the contaminated liquid(s) function as a medium for containing the treatment composition(s) as they flow along the pipelines and assuring much greater contact with between the contaminated gasses and the treatment compositions. Also, multiple dosages of the treatment compositions can be added at different times and different parts of the pipeline as discussed herein.

In the treatment processes according to the present invention, standard dosage amounts of the treatment compositions will depend on the type of fluid(s) being treated. For liquid fluids, standard dosage rates are 0.1-6.0 ml of the treatment composition/liter of contaminated liquid fluids being treated, preferably 1.0-5.0 ml of the treatment composition/liter of the liquids being treated, which corresponds to approximately 100-6000 ppm of the treatment composition in the liquid being treated based on the discussed concentration of hydroxide(s) in the composition.

For treatment of gaseous fluids by bubbling through a volume of the treatment composition(s), the inventor has determined that a continuous flow of natural gas from a well at 1-3 million ft³/day, including high concentrations of $H_2S$ and $CO_7$, e.g., 2,000-300,000 ppm, and other contaminants may be successfully treated down to less than 1 ppm for each of the contaminants using 1-4 gallons/hour or 24-96 gallons total of the treatment composition provided that there is at least 1 second of contact between the gas and the treatment composition, which can be achieved in various manners as discussed herein. In this arrangement, the treatment compositions contained in a reactor or reaction tower may be replaced or rejuvenated as they become spent, which results in the use of 1-4 gallons/hour of the treatment compositions.

For treating flowing streams of gaseous fluids by injection of the treatment composition(s) into the flowing streams, generally this is not a preferred manner of treating the contaminated gasses according to the present invention because it is relatively inefficient in comparison to other treatment processes according to the present invention due to the limited contact that can be achieved between the liquid treatment compositions and the flowing gas. Instead, the inventor has found that treating contaminated gasses is more efficiently and effectively achieved according to the present invention by treating the contaminated gas as part of a mixed fluid stream and/or by bubbling the contaminated gasses through a volume of the treatment composition(s). Due to the inefficiency involved, if a contaminated gas stream is to be remediated by injection of the treatment composition(s) into the gas stream the dosage rate would need to be at least as much as the dosage rate discussed herein for treating a mixed fluid stream containing both liquid and gaseous fluids.

For treating a mixture containing both liquid and gaseous fluids, appropriate dosage amounts of the new hydrocarbon liquid based treatment compositions will be based on amount of the fluid mixture stream being heated, as well as other considerations such as the specific types and amounts of different contaminants in the mixed fluid stream. A typical oil well may continuously output of 125 to several thousand barrels of crude oil, 150 or more barrels of produced water and 1 million to 50 million ft$^3$ of natural gas day (24 hours) in a mixed fluid stream. In such mixed fluid stream the $H_2S$ content may be 60,000 ppm or higher of $H_2S$ and the $CO_2$ content may be 40,000 ppm or higher. The inventor has found that an appropriate total amount of the new hydrocarbon liquid based treatment composition(s) to be added for treating such mixed fluid stream output from a well may be in a range of 2 to 10 gallons of treatment composition(s) added per hour or 48-240 gallons per day. The discussed standard dosage rates are generally effective for remediating $H_2S$ concentrations up to down to safe, acceptable levels in the contaminated liquids and for reducing the amounts of contaminants in contaminated gasses down to ½ to ⅓ of the original values.

Within the discussed dosage rate ranges in the various treatment processes according to the present invention, most appropriate dosage amounts of the treatment compositions to be added to or contacted with contaminated fluids during the treatment processes may be determined based on a few considerations, e.g., the amounts of $H_2S$ and other contaminants in the fluid(s) that need to be remediated, other characteristics of the fluids including viscosity or API density for liquids (the term API as used herein, is an abbreviation for American Petroleum Institute), desired reaction rate/time, specific result desired including whether precipitate(s) are to be formed and released from the fluids, and whether the treated fluids are to be mixed and/or heated during the treatment process. For example, mixing liquids at moderate to high speeds to rapidly disperse the treatment composition throughout the treated liquid may reduce required reaction time by 50%, whereas some highly viscous liquids such as bunker fuel may require heating to permit proper dispersion of the treatment composition therein. The appropriate dosage rate is substantially, linearly scalable within the discussed ranges in relation to the various characteristics.

One important advantage of the treatment compositions and treatment processes according to the present invention is that the treatment compositions can be added in excess amounts above optimum dosage levels to the contaminated fluids because any unreacted amounts of the treatment compositions remaining in the treated fluids generally will not adversely affect the treated fluids or reduce their value. While it is generally desirable to add optimum dosages of the treatment compositions to the contaminated fluids, the types and amounts of contaminants in a flowing stream of contaminated fluid(s) may vary over short periods of time and it may not be practical or efficient to continuously monitor types and amounts of contaminants in a given stream of contaminated fluid(s) for attempting to determine and add optimum dosage(s) of the treatment composition(s). For example, when treating a mixed fluid stream discharged from a given well, the types and amounts of contaminants in the stream can greatly vary over a 24 hour period. With the treatment compositions and processes according to the present invention, it is appropriate to add dosage(s) of the compositions sufficient to properly remediate a worst case situation within the likely range of possibilities for the types and amounts of contaminants in the stream without concern for any damage due to excess treatment composition(s) remaining in the treated fluids.

An exemplary embodiment of a treatment process for remediating and/or removing $H_2S$, $CO_2$ and other contaminants from various contaminated fluid mixtures, including liquids such as crude oil and contaminated water that is extracted with crude oil from a well and/or gasses such as natural gas, using the new hydrocarbon liquid based treatment compositions is based on the inventor's discovery that such contaminated fluid mixtures may be efficiently and effectively treated for remediation of the $H_2S$, $CO_2$ and other contaminants by adding appropriate dosage(s) of the new hydrocarbon liquid based treatment compositions discussed herein to a contaminated fluid mixture stream including all three fluids as it is extracted from a well and flowing in a pipeline toward a refinery or other destination and/or into a mixture of crude oil and natural gas after the produced water has been separated out by a separator. As the fluid mixtures having the treatment composition combined therewith flow in a pipeline or other transportation means toward a refinery or other destination, e.g., typically for many miles and over a period of an hour or more, the treatment composition(s) will react with and remediate the $H_2S$, $CO_2$ and some other contaminants in all of the mixed fluids, both liquid and gaseous, such that the content of these contaminants will be significantly reduced by the time the fluid mixture arrives at the refinery or other destination. The treatment compositions are effective to simultaneously remediate the $H_2S$, $CO_2$ and some other contaminants in each of the contaminated fluids fairly quickly, although remediation of contaminated gasses will generally take longer than remediation of the contaminated liquids as discussed herein. The inventor has determined that even if the contaminated fluid mixture contains a relatively high content of $H_2S$ and $CO_2$ when it is extracted from the well, e.g., 60,000 ppm and higher for $H_2S$ and 40,000 and higher for $CO_2$, the content of the $H_2S$ and $CO_2$ in the liquid portion of the mixture, e.g., crude oil and produced water, may be reduced down below 5 ppm, and the content of the $H_2S$ and $CO_2$ in the gaseous portion of the mixture, e.g., natural gas, may be reduced by 60% or more through the present treatment process.

Very importantly the treatment compositions can be formulated to assure that little or no precipitates will be discharged from the treated fluid mixture stream as it flows with the treatment composition(s) added thereto. For example, the inventor has discovered that organic acids such as fulvic acid and humic acid can be very effective for this purpose when included in the treatment compositions at 0.1-6.0 wt % as these organic acids help to keep the remediated and non-remediated contaminants dissolved and/or dispersed in the treated fluids. Similarly, the inventor has discovered that addition of 0.1 to less than 5 wt %, and preferably less than 2 wt %, of a polymer such as anionic polymer 3640 to the treatment compositions can help to prevent any salts and some other contaminants in the fluids being treated from precipitating out of the treated fluids. Still further, the relative amount of the hydrocarbon liquid(s) in the treatment compositions which also contain water can be increased to help prevent release of precipitates from the treated fluids. For example, when treating contaminated natural gas containing more than 0.3 to 0.5 volume % of water having salt(s) dissolved in the water, it may be desirable to increase a volume % of the hydrocarbon liquid(s) in the treatment compositions above 25 volume % to help prevent the salt(s) from precipitating out of the treated gas, but if the water content is not above 0.3 to 0.5 volume % it may be sufficient to include only up to 25 volume % of the hydrocarbon liquid(s) in the treatment compositions without concern for causing the salts to precipitate out of the treated gas.

For effecting such treatment process of a contaminated, mixed fluid stream, the inventor has determined that dosage(s) of the treatment composition may be added to the fluid mixture as it is extracted from the well and is flowing toward a separator or other destination so that treatment composition may remediate some of the $H_2S$, $CO_2$ and some other contaminants simultaneously in all three fluids of the fluid mixture. While the produced water extracted with the oil and natural gas is often separated out and discarded by being injected back into the earth, it is still desirable to remediate much of the $H_2S$ therein before being injected back into the earth so that it will not pose a potential health hazard. Dosage(s) of the treatment composition(s) may alternatively or additionally be added to a mixture of the crude oil and natural gas after the fluid mixture has passed through a separator to remove liquid, water based component. Of course, it is possible to add the treatment composition to a single contaminated fluid such as crude oil or natural gas in a treatment process according to the present invention, but treating just the natural gas can be significantly more complicated and inefficient. The inventor has discovered that treating the contaminated natural gas when it is combined with one or more contaminated liquids such as crude oil and produced water and flowing together in a pipeline or other transportation means is much more efficient because the contaminated liquid(s) function as a means for containing the treatment composition(s) in the flowing fluids whereby there will be substantial contact between the treatment compositions and the natural gas permitting efficient remediation of the contaminated natural gas.

A significant discovery by the inventor relating to the treatment processes according to the present invention is that when the new hydrocarbon liquid based treatment composition(s) are added to a contaminated fluid mixture stream it is very important to control and monitor pH of the mixed fluid stream being treated in order to prevent formation and/or release of precipitates therefrom. A typical fluid mixture extracted from an oil/gas well may have an initial pH value of 5-6, but due to the highly alkaline nature of the new hydrocarbon liquid based treatment composition(s) the pH of the mixed fluid stream will increase when the treatment composition(s) are added thereto, particularly in small, localized pockets of the fluid stream where the hydrocarbon liquid based treatment composition(s) are added to the stream. Typically the final pH of a fluid stream treated according to the present invention may be around 7.0-7.3, but as the treatment compositions are added to pockets of the fluid stream, these fluid mixture in such pockets will temporarily spike to much higher pH values which can cause formation and release of precipitates from these pockets. The inventor has discovered that when using the new hydrocarbon liquid based treatment composition(s) for treating the mixed fluid stream, rather than using one of the inventor's previously proposed water based treatment compositions as are used in a treatment process disclosed in PCT/US2021/058610, it is appropriate for the pH of the treated mixed fluid stream, including pockets of the fluid stream, to be increased to a higher value above 10 without concern for causing formation and/or release of precipitates from the mixed fluid stream. As discussed in PCT/US2021/058610, the inventor previously discovered that the pH of the treated fluid stream should not be increased to a value above about 10, even in small, localized pockets of the fluid stream where the water based treatment composition(s) are added to the stream, in order to prevent formation and/or release of precipitate(s) from the mixed fluid stream. However, with the treatment process according to the present invention using the new hydrocarbon liquid based treatment composition(s), the inventor has discovered that the pH of the treated mixed fluid stream, including pockets of the stream, may be increased to a value above 12 without concern for causing formation and/or release of precipitates from the mixed fluid stream. The inventor has discovered that in the treatment processes using the new hydrocarbon liquid based treatment composition(s) there is little concern about formation and/or release of precipitates until the pH is increased to about 12.5, including in small, localized pockets of the fluid stream where the hydrocarbon liquid based treatment composition(s) are added to the stream.

The ability to increase the pH of the treated, mixed fluid stream to above 12 in the new treatment process advantageously allows for more of the new hydrocarbon liquid based treatment composition(s) to be added to the mixed fluid stream overall and in various dosages without concern that precipitates may be formed and/or released, as compared to the treatment process disclosed in PCT/US2021/058610 using the inventor's previously proposed, water based treatment compositions. Based on the ability to go to a higher pH the new treatment process can achieve a greater and/or more efficient level of remediation of $H_2S$, $CO_2$ and some other contaminants in the mixed fluid stream compared to the treatment process disclosed in PCT/US2021/058610, and this leads to the new treatment process achieving greater effectiveness and greater efficiency in remediating the contaminants in the mixed fluids. Also, because the hydrocarbon liquids used in the new treatment composition generally include less water than the inventor's previously proposed water based treatment compositions, this may result in slightly higher quality for the treated hydrocarbon fluids including crude oil and natural gas in comparison to treatment processes involving inventor's water based treatment compositions.

For appropriately controlling pH of the mixed fluid stream in the treatment process of the present invention, it is also advantageous to add or inject the treatment composition to the mixed fluid stream in multiple smaller dosages and/or at multiple locations and/or at different times, so that no portion of the treated fluids will experience even a temporary pH increase above 12.5 because this may result in release of precipitates. In other words, it is desirable that the entire dosage amount of the new hydrocarbon liquid based treatment composition should not be injected at a single location and/or at a single time as this may likely result in the pH of the mixed fluid stream, or the pH of a pocket of the mixed fluid stream, being raised above 12.5 temporarily. Even a temporary increase in the pH above 12.5 may cause undesirable formation and/or release of precipitates from the treated fluid stream. The specific dosage amounts may be determined based on pH of the mixed fluid stream, which may also be monitored at multiple locations along the flowpath of the mixed fluid stream. The pH of the treated mixed fluid stream generally corresponds to the remaining, non-reacted amount of the new treatment composition remaining in the mixed fluid stream, and correspondingly such monitoring of the pH allows for further appropriate dosage amount(s) of the treatment composition to be added to the mixed fluid stream, if necessary, as it continues to flow toward a refinery or other destination. By adding smaller dosage amounts of the treatment composition at multiple locations of the mixed fluid stream and/or at different times desirably permits more of the treatment composition to be added to the mixed fluid stream without concern for causing formation and/or release of precipitates. This also leads to the new treatment process achieving greater effectiveness and greater efficiency in remediating $H_2S$, $CO_2$ and the other contaminants in the mixed fluid stream in comparison to all other known treatment processes, including the treatment processes involving inventor's water based treatment compositions.

In the treatment processes of the present invention, the treatment compositions may be directly injected into the fluid mixtures, e.g., by using an appropriate injection nozzle that injects the treatment compositions under pressure into the fluid mixtures. However, for purposes of adding additional dosages of the new treatment composition to the oil and gas mixture stream after the liquid water component(s) have been separated therefrom via the separator, one appropriate system that may be used involves use of a mixing chamber, as discussed further herein.

Maintaining pH of the treated fluid mixture stream being treated, including localized pockets of the steam where the treatment composition is added to the stream, at a value of about 12 or below in the treatment process of the present invention is important for preventing release of precipitates such as salts, rag components, etc. However, once the water based components of the fluid stream are separated from the oil and natural gas at some point using a separator, there is less concern regarding release of precipitates such as salts, rag components, etc. from the remaining oil and gas mixture because these contaminants mostly remain in the liquid, water based component(s) that are separated out. Hence, pH of the remaining mixture of oil and natural gas may be increased above 12 when additional dosages of the treatment composition are added thereto after the liquid, water based component(s) are separated therefrom with less concern that precipitates will be released from the further treated oil and gas mixture. However, maintaining the pH of the further treated oil and gas mixture at a value of about 12 would still be appropriate for further remediating $H_2S$, $CO_2$ and some other contaminants in the oil and natural gas fluid mixture.

Referring to the drawing, there is shown a system 100 for remediating contaminated mixed fluids according to an exemplary embodiment of the present invention. The system 100 may generally a well 10 watch outputs a fluid mixture of crude oil, produced water and natural gas, a first treatment station 50 at which first dosage(s) of treatment composition may be added to fluid mixture from the well, a separator 104 which receives fluids output from the well 10 after the first dosage(s) of the treatment composition have been added at the station 50 and separates the liquid, water based component(s) of the fluid mixture from the oil and natural gas components of the mixture, a mixing chamber 102 which is depicted as extending horizontally but may extend in any direction and receives an oil and natural gas mixture from the separator 104, a discharge nozzle 106 which discharges the mixed fluid into the reactor, a discharge outlet 108 which discharges the fluid mixture from the mixing chamber 102 after treatment composition has been added and uniformly mixed therein, a supply of the treatment composition 110, a re-circulation pump 112 which may withdraw a portion of the mixed fluid from the reactor 102 via a discharge outlet 114 at a bottom of the reactor, add appropriate dosage(s) of treatment composition from the supply 100 thereto and then add the fluid mixture and treatment composition to the flow of untreated fluid mixture from the separator 104 which is flowing into the reactor. In the system 100 by the time the contaminated mixture of oil and natural gas reaches the discharge outlet 108, it will be uniformly mixed with the treatment composition(s) added thereto, so that after the treated fluid mixture is discharged and is flowing along a pipeline or other transportation means the treatment compositions(s) can efficiently remediate the contaminants remaining in the fluid mixture. A controller 116 such as a programmed electronic processing unit (ECU) may be provided for controlling operations of the system 100, and the controller would receive various inputs from sensor(s) (not shown) pertaining to characteristics of the system and the fluid mixture. Again, use of the mixing chamber 102 and other associated components of the system 100 is optional as the treatment processes according to the present invention may simply involve directly injecting the treatment composition(s) into the fluid mixtures or fluid mixture streams.

The mixing chamber 102 may be formed of an appropriate material such as carbon steel which is resistant to reacting with the mixed fluid and the contaminants in the mixed fluid including $H_2S$, and may have an appropriate size based on the volume of mixed fluid being treated. For example if the volume of mixed fluid being treated is 125-1000 barrels of crude oil, and 10 million to 50 million $ft^3$ of natural gas/day (24 hours), an appropriate size for the mixing chamber 102 may be 5-10 feet in diameter and 12-25 feet long. The discharge nozzle 106 may include one or more pipe(s) extending longitudinally along the lower portion of the mixing chamber and having numerous small openings formed therein in pipe(s), whereby the fluid mixture will enter the mixing chamber in the form of small fluid streams containing bubbles of the gas in the mixture. The pressure of the mixed fluid stream and the gas bubbles will cause fluid streams from the numerous small openings to flow upward through a large quantity of the mixed fluid and treatment composition already in the mixing chamber so as to thoroughly mix with the same. By the time that the mixed fluid and treatment composition reaches the upper portion of the mixing chamber where a portion of the same is discharged through the outlet 108 the mixed fluid and treatment composition are combined in a homogenous mixture.

The re-circulation pump 112 may be any appropriate type of pump, but the inventor has found that a pneumatic-diaphragm pump works appropriately for not only for re-circulating and mixing the mixed fluid with treatment composition from the supply 110, but also for maintaining an appropriate, desired concentration of the treatment composition in the mixing chamber and in the mixed fluid discharged from the reactor through outlet 108. A portion of the mixed fluid in the mixing chamber may be continuously withdrawn from a bottom portion of the mixing chamber, mixed with additional treatment composition and then again flowed into the mixing chamber along with additional mixed fluid from the separator. For adding the treatment composition to the mixing chamber, the concentration of the treatment composition in the mixed fluid being withdrawn from the mixing chamber may be monitored by a sensor (not shown) based on pH. If the rate at which the treatment composition is being added needs to be adjusted based on the sense value, the rate at which the treatment composition is added via the re-circulation pump 112 may be appropriately adjusted by the controller 116.

The fluid mixture from the well 10 having the treatment composition added at station 50 may be permitted to react for 15 seconds or more before going into the separator 104, and this may be achieved by providing a pipeline between the station 50 and the separator 104 having appropriate length, etc. The inventor has determined that under these conditions at the point that the fluid mixture stream reaches the separator 104 the $H_2S$ and $CO_2$ in the liquid components of the mixture, e.g., oil and water, are typically reduced to very low values such as 5 ppm or less, although the $H_2S$ and $CO_2$ in the gaseous components of the mixture, e.g., natural gas, is typically reduced to about ½ of original values. The treated fluid mixture may then be passed through the separator to remove the liquid, water based component(s) from the oil and gas components. The liquid, water based component(s) will typically have little or no $H_2S$ and $CO_2$ remaining therein, although these component(s) will still contain significant amounts of other contaminants, including salts and rag components, and may be disposed of by being injected back into the earth, via a salt water disposal well.

After being discharged from the separator 104, a mixture of the partially remediated oil and gas components may then have additional dosage(s) of the hydrocarbon liquid based treatment composition(s) added thereto, e.g., via the mixing chamber 102, if necessary depending on the specific characteristics of the mixed fluid stream. Any such additional dosage(s) will further remediate any $H_2S$ and some other contaminants remaining in the mixture as it flows along a pipeline for further processing, e.g., at a refinery. Given that the $H_2S$ and $CO_2$ in the oil may already be remediated down to 5 ppm or less through the initial dosage(s) of the treatment composition added to the fluid mixture as it is extracted from the well 10, the additional dosages of the treatment composition will primarily function to further remediate the $H_2S$, $CO_2$ and some other contaminants in the natural gas.

EXAMPLES OF THE NEW TREATMENT PROCESSES

Example 1

A treatment composition for treating a fluid mixture stream containing crude oil, produced water and natural gas from a well included 25 volume % collectively of methanol and/or other alcohols and 75 volume % of an aqueous solution containing 50 wt % collectively of one or more hydroxide compounds, but necessarily including at least potassium hydroxide. The fluid mixture treated had a varying composition, but generally included 125 to 2000 barrels of crude oil, 150 to 5000 barrels of produced water and 1 million to 3 million of natural gas/day (24 hours) in a mixed fluid stream, and in such mixed fluid stream the $H_2S$ was 30,000-90,000 ppm of $H_2S$ and the $CO_2$ content was 40,000-60,000 ppm. Dosage rate of the treatment composition for treating the fluid mixture was 3-5 gallons/hour, and the treatment composition was added in multiple locations and periodically over a 24 hour period, including dosages added to the fluid stream as it is extracted from the well and dosages added to the fluid stream 10 to 30 meters downstream of the well, and the treated fluid stream then flowed toward a refinery some distance away over more than one hour. Most of the remediation of the contaminants in the liquid portions of the fluid stream occurred within the first 30 meters of flow of the fluid stream within the pipeline, while remediation of the contaminants in the gaseous portion of the fluid stream continued to occur until the fluid stream reached the refinery. Final numbers were less than 1 ppm of each of $H_2S$ and the $CO_2$ in the liquid portions of the fluid stream and the amounts of $H_2S$ and $CO_2$ in the gaseous portion of the stream was reduced to 15,000 0 18000 ppm each. There was some amount of precipitate from the treated fluids, which was mostly salt (NaCl).

Example 2

Everything for this Example was the same as in Example 1 except that the treatment composition used further included 1 wt % of the anionic polymer 3640 for the purpose of preventing discharge of any precipitates from the treated fluids, including salts. The results of the treatment process were the same as in Example 1 but there was essentially no precipitates discharged from the treated mixed fluid stream.

Example 3

A treatment composition for treating containing crude oil included 25 volume % collectively of methanol and/or other alcohols and 73 volume % of an aqueous solution containing 50 wt % collectively of substantially equal amounts of potassium hydroxide and sodium hydroxide, 1 volume % of an aqueous solution containing 5 wt % of fulvic acid, and 1 volume % of an aqueous solution containing 40 wt % of EDTA. The contaminated crude oil contained about 27,000 ppm of $H_2S$ with a collective lesser amount of other some sulfur based contaminants and less than 1 volume % of water. The treatment composition was added to 25,000 gallons of contaminated oil at a dosage rate of 2 ml of treatment composition/liter of contaminated oil and permitted to react for 1 hour. The treated oil contained less than 1 ppm of $H_2S$.

Example 4

A treatment composition for treating a stream of contaminated natural gas was prepared that included 25 volume % collectively of methanol and/or other alcohols and 73 volume % of an aqueous solution containing 50 wt % of potassium hydroxide, 1 volume % of an aqueous solution containing 5 wt % of fulvic acid and 1 volume % of an aqueous solution containing 40 wt % of EDTA. The contaminated natural gas contained from 7000 to 85,000 ppm $H_2S$, 40,000 to 60,000 ppm of $CO_2$, and about 1 volume % water which was saturated with NaCl, and was flowing at 2 to 4 ft$^3$/day and an unknown amount of nitrogen. About 2500 gallons of the treatment composition was placed in a reaction tower tower six (6) feet in diameter and twenty five (25) feet tall, and contaminated natural gas was continuously flowed through the treatment solution in the reaction tower for 3 days and pressure of the contaminated gas was regulated to assure at least 2 seconds of contact as the gas bubbled through the treatment composition. After the natural gas passed through the treatment solution in the reaction tower, the concentration of each of $H_2S$ and $CO_2$ was reduced to substantially 0 ppm (undetectable).

Example 5

A treatment composition for treating a stream of contaminated natural gas was prepared that included 50 volume % collectively of methanol and/or other alcohols, 23 volume % of an aqueous solution containing 50 wt % collectively of potassium hydroxide, 25 volume % of an aqueous solution containing 20 wt % of sodium sulfide and 1 volume % of an aqueous solution containing 5 wt % anionic polymer 3640. The contaminated gas treated was the same as in Example 4 and the treatment process was the same as in Example 4 except for the treatment composition. After the natural gas passed through the treatment solution in the reaction tower, the concentration of each of $H_2S$ and $CO_2$ was reduced to substantially 0 ppm (undetectable), and the overall sulfur content in the contaminated gas was reduced by approximately 50%.

The foregoing description is given for clearness of understanding only, and no unnecessary limitations should be understood therefrom, as modifications within the scope of the invention may be apparent to those having ordinary skill in the art and are encompassed by the claims appended hereto.

I claim:

1. A treatment composition for remediating for remediating $H_2S$, $CO_2$ and other contaminant(s) in a fluid mixture of contaminated liquids and gasses comprising: a hydrocarbon based liquid; at least one hydroxide compound dispersed or dissolved into the hydrocarbon based liquid; and at least one organic acid selected from the group consisting of fulvic acid and humic acid, wherein the at least one hydroxide compound dispersed or dissolved into the hydrocarbon based liquid constitutes 30-50 wt % of the treatment composition, the at least one hydroxide compound includes at least one of potassium hydroxide and sodium hydroxide, the at least one organic acid constitutes 0.1-6.0 wt % of the treatment composition and a pH of the treatment composition is in a range of 13-14.0.

2. The treatment composition according to claim 1, further comprising a chelating agent and the chelating agent constitutes 0.1-5 wt % of the treatment composition.

3. The treatment composition according to claim 2, wherein the chelating agent includes ethylenediamine tetraacetic acid (EDTA).

4. The treatment composition according to claim 1, further comprising 0.1 to 8.0 wt % of sodium sulfide ($HNa_2S$).

5. The treatment composition according to claim 1, wherein the hydrocarbon based liquid includes an alcohol, toluene, hexane, xylene, and mixtures of these liquids.

6. The treatment composition according to claim 1, wherein the hydrocarbon based liquid includes at least one of methanol, ethanol and n-propyl alcohol.

7. The treatment composition according to claim 1, further comprising water and the water constitutes 1 to 50 volume % of the treatment composition.

8. A treatment process for remediating $H_2S$, $CO_2$ and other contaminant(s) in a fluid mixture stream of contaminated liquid and contaminated gas, comprising steps of: adding a dosage of the treatment composition of claim 1 to the fluid mixture stream to bring a pH of the fluid mixture having the treatment composition added thereto to be about 12 but not more than 12.5 in a localized pocket where the treatment composition is added to the fluid mixture stream, and flowing the fluid mixture stream having the treatment composition added thereto through a pipeline to permit the treatment composition to remediate contaminants in the fluid mixture.

9. The treatment process according to claim 8, wherein the fluid mixture stream initially contains more than 20,000 ppm of each of $H_2S$ and $CO_2$.

10. The treatment process according to claim 8, wherein the treatment composition is added to the mixed fluid stream at multiple locations and/or at different times.

11. A treatment process for remediating $H_2S$ and other contaminant(s) in a contaminated liquid fluid containing more than 5 ppm of $H_2S$, comprising steps of: adding a dosage of the treatment composition of claim 1 to the contaminated liquid fluid at a dosage rate of 0.25-6 ml of the treatment composition per liter of contaminated liquid fluid, and permitting treatment composition to remediate contaminants in the fluid mixture until the content of $H_2S$ in the treated liquid fluid is below 5 ppm.

12. A treatment process for remediating $H_2S$ and other contaminant(s) in a contaminated gaseous fluid containing more than 5 ppm of $H_2S$, comprising steps of: providing a volume of the treatment composition of claim 1 in a reaction chamber, and bubbling a stream of the contaminated gaseous fluid through the volume of the treatment composition in the reaction chamber to remediate contaminants in the fluid mixture until the content of $H_2S$ in the treated liquid fluid is below 5 ppm, wherein the pressure of the contaminated gaseous fluid stream is regulated and/or a height of the treatment composition in the reaction chamber through which the contaminated gaseous fluid stream bubbles is adjusted so that the contaminated gaseous fluid stream is in contact with treatment composition in the treatment chamber for at least 1 second.

13. The treatment process according to claim 12, wherein a head space is defined within the reaction chamber above a the volume of treatment composition in which vapors of the treatment composition may accumulate such that the vapors of the treatment composition in the headspace may further react with the contaminated gaseous fluid after the fluid passes through the volume of treatment composition.

14. A treatment composition for remediating for remediating $H_2S$, $CO_2$ and other contaminant(s) in a fluid mixture of contaminated liquids and gasses comprising: a hydrocarbon based liquid; at least one hydroxide compound dispersed or dissolved into the hydrocarbon based liquid and a polymer, wherein the at least one hydroxide compound dispersed or dissolved into the hydrocarbon based liquid constitutes 30-50 wt % of the treatment composition, the at least one hydroxide compound includes at least one of potassium hydroxide and sodium hydroxide, a pH of the treatment composition is in a range of 13-14.0, and the polymer constitutes 0.1 to less than 5 wt % of the treatment composition.

15. The treatment composition according to claim 14, wherein the polymer includes anionic polymer 3640.

16. A treatment process for remediating $H_2S$, $CO_2$ and other contaminant(s) in a fluid mixture stream of contaminated liquid and contaminated gas, comprising steps of:

adding a dosage of a treatment composition to the fluid mixture stream to bring a pH of the fluid mixture stream having the treatment composition added thereto to be about 12 but not more than 12.5 in a localized pocket where the treatment composition is added to the fluid mixture, the treatment composition comprising a hydrocarbon based liquid and at least one hydroxide compound dispersed or dissolved into the hydrocarbon based liquid, wherein the at least one hydroxide compound dispersed or dissolved into the hydrocarbon based liquid constitutes 30-50 wt % of the treatment composition, the at least one hydroxide compound includes at least one of potassium hydroxide and sodium hydroxide, a pH of the treatment composition is in a range of 13-14.0, flowing the fluid mixture stream having the treatment composition added thereto through a pipeline to permit the treatment composition to remediate contaminants in the fluid mixture, wherein the fluid mixture stream contains a liquid water component, a liquid hydrocarbon component and a natural gas component, and the treatment process includes further steps of:

separating the liquid water based component from the liquid hydrocarbon based component and the natural gas component of the treated mixed fluid stream, combining the liquid hydrocarbon based component and the natural gas component as a new fluid mixture stream, adding a further dosage of the treatment composition to the new mixed fluid stream, and permitting the treatment composition to further remediate contaminants in the new mixed fluid stream.

17. The treatment process according to claim 16, wherein a collective dosage of the treatment composition added to the fluid mixture stream and the new fluid mixture stream is 2 to 10 gallons of treatment composition added per hour based on a volume of the mixed fluid stream of 200-1000 gallons/hour of liquid and 416,667-2,083,333 $ft^3$/hour of gas.

* * * * *